United States Patent [19]

Ibe et al.

[11] Patent Number: 4,951,422
[45] Date of Patent: Aug. 28, 1990

[54] EXTERNAL CYLINDRICAL GRINDING UNIT

[75] Inventors: Hiroyuki Ibe; Takashi Mori, both of Fukui, Japan

[73] Assignee: Shin-Etsu Handotai Company Limited, Tokyo, Japan

[21] Appl. No.: 432,432

[22] Filed: Nov. 6, 1989

[30] Foreign Application Priority Data

Nov. 10, 1988 [JP] Japan .................................. 63-282559

[51] Int. Cl.⁵ ............................................. B24B 49/00
[52] U.S. Cl. .............................. 51/165.71; 51/165.77; 51/237 R
[58] Field of Search .......... 51/165.71, 165.77, 165.72, 51/237 R; 409/219, 224, 242, 903; 82/142, 146, 148

[56] References Cited

U.S. PATENT DOCUMENTS 4,416,570 11/1983 Argenbright .................. 409/903 X
4,766,700 8/1988 Kramberg et al. .......... 51/165.72 X Primary Examiner—D. S. Meislin
Assistant Examiner—M. Rachuba
Attorney, Agent, or Firm—Lowe, Price, Leblanc, Becker & Shur

[57] ABSTRACT

An external cylindrical grinding unit which comprises a supporting system for supporting a cylindrical body to be ground, a measurement system for measuring the cylindrical body, an arithmetic system for calculating an optimal center axis of the cylindrical body based on the measurement thereof, an alignment system for aligning the optimal center axis of the cylindrical body with the rotation axis about which the cylindrical body is rotated for grinding, and a driving system for driving movable elements of the unit.

5 Claims, 4 Drawing Sheets

EXTERNAL CYLINDRICAL GRINDING UNIT

BACKGROUND OF THE INVENTION

The present invention relates to an external cylindrical grinding unit capable of automatically determining an optimal center axis of a cylindrical substance such as semiconductor monocrystal ingot and aligning the optimal center axis of the cylindrical substance with the rotation axis of the grinding unit.

For example, in a semiconductor wafer manufacturing line, a semiconductor monocrystal ingot which is obtained in a crystal pulling method such as the Czochralski method and the floating zone method has generally a circular cylinder-like shape with two cone-shaped ends. The two cone-shaped ends of the monocrystal ingot are severed from the main body of the monocrystal ingot with the sections approximately normal to the center line of the main body. The cylindrical monocrystal ingot is then sliced into thin wafers in a manner such that the slicing direction is normal to the center line of the ingot. However, due to irregular surfaces of the ingot, the wafers sliced from the ingot would naturally have varying diameters and irregular circumferences. To prevent this, the ingot is ground by an external cylindrical grinding machine into the shape of the right circular cylinder, prior to the slicing operation.

To obtain a right circular cylinder with the maximum diameter from an irregularly contoured cylindrical ingot, it is the primary importance to determine an appropriate optimal center axis, based on which the grinding operation is to be conducted. The ingot is to be rotated about the optimally determined center axis while it is externally ground.

In other words, to attain the best yield of the right cylindrical ingot, the optimum center axis should be determined such that the uniform diameter of the wafers sliced from the cylindrical monocrystal ingot will be the largest possible. To attain this end, methods were proposed which include Japanese Patent Laid Open Publication (Kokai) No. 6017682 (1985), and Japanese Patent Laid Open Publication (Kokai) No. 61-33446 (1986).

According to Japanese Patent Laid Open Publication (Kokai) No. 60-17682, the center axis of a log is determined in the following manner: a log is rotated about a provisional center axis; light beams are applied to the log normally to the axis thereof from a side position; that light beam which is exactly tangent to the surface of the log is detected every time the log is rotated by intervals of a predetermined angle at a plurality of locations taken along the length of the log; a polygon is obtained from the detected tangent beams at each detection location; the maximum right circular cylinder confined by the polygons is obtained; and the center line of the confined maximum right circular cylinder is obtained, which is then taken as the center axis about which the log is rotated and externally ground.

According to Japanese Patent Laid Open Publication (Kokai) No 61-33446, the center axis of a log is determined by first detecting the contours of at least three cross sections taken normally to the provisional center axis at arbitrarily selected locations including the two end faces; finding the radii and the centers of the maximum inscribed circles in the respective cross sections; then obtaining the maximum right circular cylinder confined by the at least three maximum inscribed circles; and finally finding the center axis of the confined maximum right circular cylinder.

However, in the field of semiconductor manufacturing the so-called "centering operation", that is, the operation of determining an optimal center axis of a monocrystal ingot is conducted in a center axis determining unit which is installed separately from the external cylindrical grinding unit. Furthermore, the ingot of which an optimal center axis has been determined is then set into the external cylindrical grinding unit by means of a separate setting unit in such a manner that the determined optimal center axis of the ingot is aligned with the rotation axis of the external cylindrical grinding unit. The installation of these separate units requires a considerable amount of installation space, and the number of operation steps required from the centering to the grinding of the ingot is undesirably large. Also, even though the optimal center axis of the ingot is determined with high precision, it is unavoidable that some error occurs as the ingot is conveyed from the optimal center axis determining unit to be set in the external cylindrical grinding unit by means of the setting unit, so that eventually the axis about which the ingot is rotated for grinding is not identical to the determined optimal center axis.

OBJECTS

The invention was made with the view of solving these problems. It is therefore an object of the invention to provide an external cylindrical grinding unit equipped with functions of determining an optimal center axis of an ingot and aligning the ingot in the grinding position with high precision.

DETAILED DESCRIPTION

First, the construction of an embodiment of the external cylindrical grinding unit according to the invention will be explained, with reference to FIGS. 1 and 2.

Figure 1:
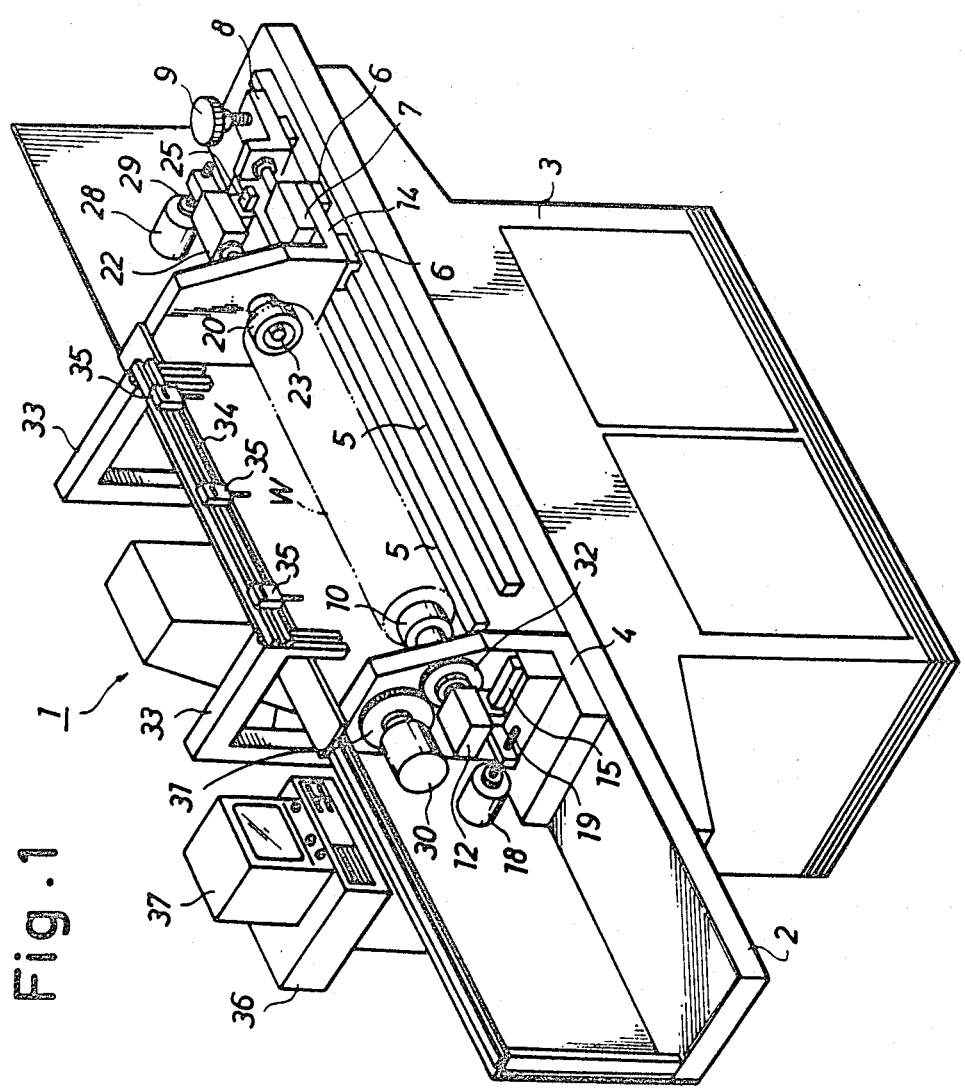
FIG. 1 is a perspective view of an external cylindrical grinding unit of the invention.

FIG. 1 is a perspective view of an external cylindrical grinding unit of the invention. FIG. 2 is a vertical longitudinal sectional view of the same external cylindrical grinding unit. In these figures, reference numeral 2 designates a base horizontally mounted on a pedestal 3. A stationary bearing bracket 4 and a movable bearing bracket 14, each consisting of a horizontal portion and vertical portion, are provided on the base 2. The stationary bearing bracket 4 is immovably fixed on the base 2. The movable bearing bracket 14 is provided with four slider feet 6 which slidably engage with a pair of parallel rails 5 laid on the base 2. The rails 5 extend in the direction parallel to the plane of paper of FIG. 2. Therefore, the movable bearing bracket 14, opposing face to face with the stationary bearing bracket 4, is capable of moving toward as well as away from the stationary bearing bracket 4. An air cylinder 7 is fixed on the horizontal portion of the movable bearing bracket 14, and a rod 7a extending from the air cylinder 7 is connected via a pair of bolts to a stationary base 8. The stationary base 8 is fixed onto the rails 5 by means of a screw 9.

A hollow clamp shaft 10 is horizontally received in the vertical portion of the stationary bearing bracket 4 via two bearings 11. The clamp shaft 10 can freely rotate on the bearings 11, but cannot shift in its axial direction. A gear 32 is fixed at the rear end of the clamp shaft 10, and this gear 32 meshes with a gear 31 fixed at the end of a drive shaft of a stepping motor 30, which is provided on the stationary bearing bracket 4. A hollow clamp shaft 20 is horizontally received ion the vertical portion of the movable bearing bracket 14 via two bearings 21. The clamp shaft 20 can freely rotate on the bearings 21, cannot shift in its axial direction.

A single rail 15 is laid on a block fixed on the stationary bearing bracket. The rail 15 extends in a direction normal to the plane of the paper of FIG. 2. A slider 16 is slidably engaged with the rail 15. An air cylinder 12 is fixedly mounted o the slider 16, and the position of the air cylinder 12 is arranged such that an adjuster rod 13 extending from the air cylinder 12 enters the hollow clamp shaft 10 coaxially. An arm 17 is integrally provided on the left side of the slider 16, as viewed in FIG. 2, and the arm 17 has a tapped hole through which a substantially long ball screw 19 is threadably passed in the direction normal to the plane of the paper of FIG. 2. The ball screw 19 is rotated by means of a stepping motor 18.

A single rail 25 is laid on a block fixed on the movable bearing bracket 14. The rail 25 extends in a direction normal to the plane of the paper of FIG. 2. A slider 26 is slidably engaged with the rail 25. An air cylinder 22 is fixedly mounted on the slider 26, and the position of the air cylinder 22 is such that an adjuster rod 23 extending from the air cylinder 22 enters the hollow clamp shaft 20 coaxially. An arm 27 is integrally provided on the right side of the slider 26, as viewed in FIG. 2, and the arm 27 has a tapped hole through which a ball screw 29 is threadably passed in the direction normal to the plane of the paper of FIG. 2. The ball screw 29 is rotated by means of a stepping motor 28.

The hollow clamp shafts 10, 20 and the adjuster rod 13, 23 constitute a supporting system for supporting a work W, e.g., a semiconductor rod; the stepping motors 18, 28, and 30 constitute an alignment system; and the air cylinders 7, 12, and 22 constitute a driving system.

As shown in FIG. 1, a pair of stand means 33, 33 are provided whose front portions are disposed to hang over the work W. The front portion of each stand means 33 has a vertical groove by means of which a horizontal guide lever 34 is held. The horizontal guide lever 34 can slide vertically along the grooves of the stand means 33, 33. The guide lever 34 has a horizontal groove, and three indicators 35 are slidably held by the guide lever 34 such that the indicators can slide in the horizontal groove. Each of these indicators 35 is capable of measuring the dimension of that cross section of the work W which is directly below the indicator 35. These indicators 35 constitute a measuring system.

The external cylindrical grinding unit 1 is complete with an arithmetic system capable of arithmetically finding out the position of an optimal center axis of the cylindrical work W based on the data of the cross sections of the work W measured by the measuring system. This arithmetic system consists of a CPU 36, CRT, 37, etc. as shown in FIG. 1.

Next, referring to FIGS. 3 through 9, the operations of the external cylindrical grinding unit according to the invention from the clamping to the grinding will be explained.

Figure 2:
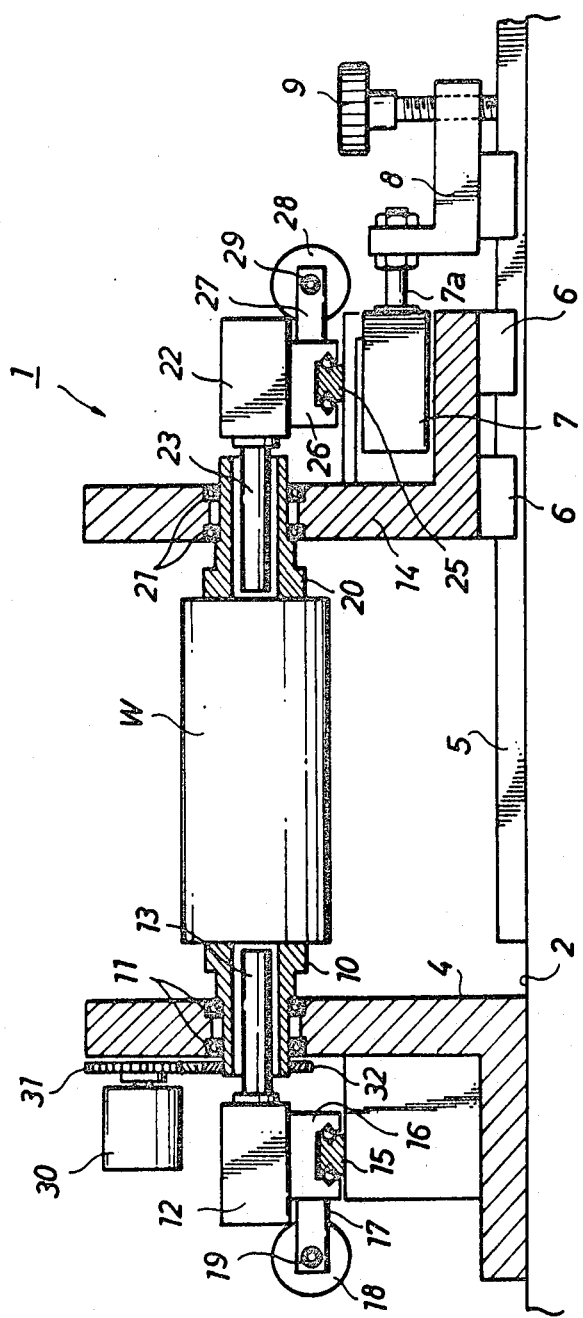
FIG. 2 is a vertical longitudinal sectional view of the same external cylindrical grinding unit.
Figure 3:
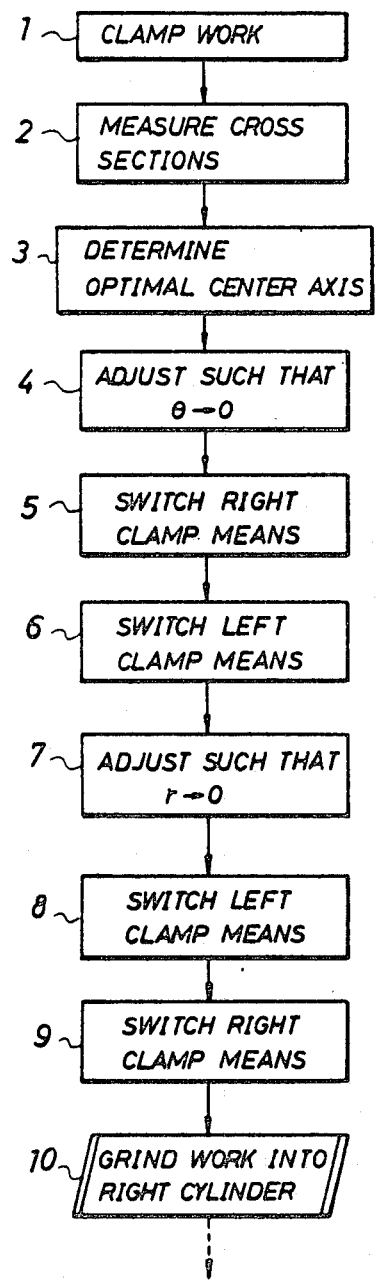
FIG. 3 depicts the operation of the grinding unit.
Figure 5:
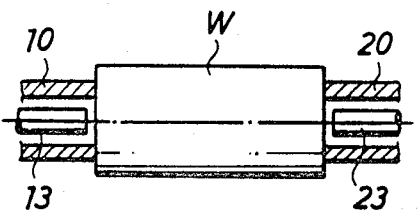
FIGS. 5 through 9 show the clamping and adjustment sequence of the grinding unit.

At first, the cylindrical work W is clamped between the clamp shafts 10 and 20, as shown in FIG. 5 (step 1 of FIG. 3). This clamping is attained by operating the air cylinder 7 such that the rod 7a is pushed out, whereby the movable bearing bracket 14 is displaced leftward, as viewed in FIG. 2, along the parallel rails 5, 5. The clamp shaft 20 on the movable bearing bracket 14 urges the work W leftward so that the left end of the work W is pressed onto the clamp shaft 10 of the stationary bearing bracket 4, whereby the work W is caught firmly between the clamp shafts 10 and 20. Incidentally, at this step 1 the adjuster rods 13 and 23 are assuming the most withdrawn position so that they do not come in contact with the work W, as shown in FIG. 5.

Next, the stepping motor 30 is operated to drive its shaft, whereby the torque is transmitted to the clamp shaft 10 by virtue of the gears 31 and 32. As the clamp shaft 10 rotate, the work W rotates together with the other clamp shaft 20. Thus, the work W is rotated through 360° and meanwhile the indicators 35 measure the dimension of those respective cross sections of the work W which are right below them (step 2 of FIG. 3). The data of the dimension of the cross sections are supplied to the CPU 36 of the arithmetic system, where the optimal center axis of the cylindrical work W is determined by a calculation in accordance with a known method of obtaining the center of the largest circle inscribed by the periphery of an intersection diagram of a plurality of closed figures (step 3 of FIG. 3). The result of the calculation is shown on the CRT 37.

After the optimal center axis of the work W is thus determined, the work W is aligned such that its determined center axis coincided with the rotation axis about which the work W is totated for grinding, that is, the common axis of the clamp shafts 10 and 20, and this aligning operation is conducted without removing the work W from the external cylindrical grinding unit 1, but rather the alignment system is operated in the following procedure.

Figure 4:
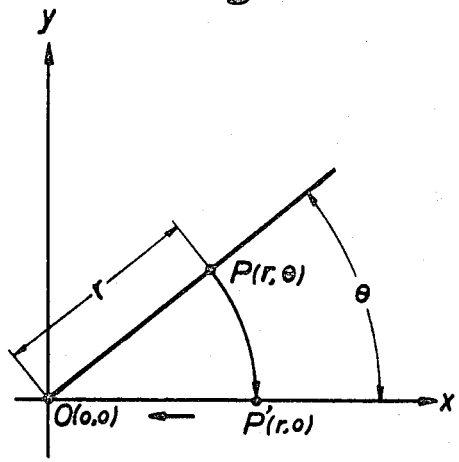
FIG. 4 is the polar coordinate system used in the operation of the grinding unit.

As shown in FIG. 4, a polar coordinate system whose origin O (O, O) coincided with the rotation axis is stored in the arithmetic system. Now, let us suppose that as the result of the calculation by the CPU 36 it is found that the optimal center axis of the work W corresponds to a point P of coordinates (r, $\theta$)in the polar coordinate system. Then, with the clamp shafts 10 and 20 clamping the work W as shown in FIG. 5, the stepping motor 30 is operated to rotate the work W through an angle of $\theta$ such that the optimum center now assumes the polar coordinates of P' (r, O) (step 4 of FIG. 3).

Figure 6:
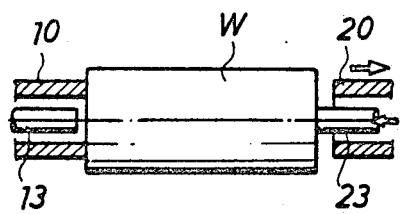

Next, the air cylinder 22 is operated such that the adjuster rod 23 is pushed out and kept pressing upon the right end of the work W; then, the air cylinder 7 is operated such that the rod 7a is pulled in, whereby the movable bearing bracket 14 is displaced rightward along the rails 5, as viewed in FIG. 2, and thus the clamp shaft 20 detaches from the right end of the work W, but the adjuster rod 23 keeps pressing the work W so that the work W is now clamped between the adjuster rod 23 and the clamp shaft 10, as shown in FIG. 6 (step 5 of FIG. 3).

Figure 7:
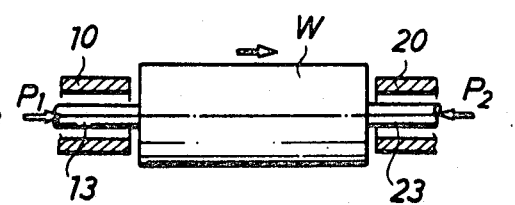

Thereafter, the air cylinder 12 is controllably operated such that the adjuster rod 13 is plunged out and presses the left end of the work W with a force $P_1$ which is greater than a force $P_2$ with which the adjuster rod 23 presses the work W whereby the work W is displaced rightward, as viewed in FIG. 7. When the work W has been displaced sufficiently such that it is clamped only by adjuster rods 13 and 23, as shown in FIG. 7, the air cylinder 12 is controlled such that the force with which the adjuster rod 13 presses the work W is reduced to $P_2$ whereby the pressing forces of the adjuster rods 13 and 23 are balanced and the work W stays as shown in FIG. 7.

Next, the stepping motors 18 and 28 are simultaneously operated to rotate the ball screws 19 and 29 till the air cylinders 12 and 22 ar displaced on the respective rails 15, 25 in the direction normal to the plane of paper of FIG. 4 by a slight distance of r whereby the work W is also moved by the distance r such that the optimal center axis at P' (r, O) is shifted to the origin O (O, O) to achieve the alignment (step 7 of FIG. 3).

Figure 8:
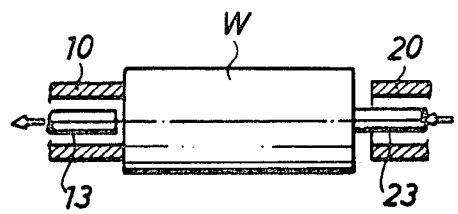

Thereafter, the air cylinder 12 is operated such that the adjuster rod 13 is withdrawn to allow the adjuster rod 23 to push the work W onto the clamp shaft 10, and when the adjuster rod 13 is further withdrawn to detach from the work W, the work W is clamped by the clamp shaft 10 and the adjuster rod 23, as shown in FIG. 8.

Figure 9:
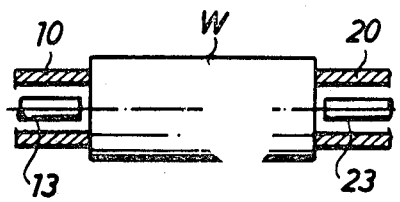

Next, the air cylinder 7 is operated such that the rod 7a is plunged out, whereby the movable bearing bracket 14 is urged to slides leftward, as viewed in FIG. 2, on the rails 5, and thus the clamp shaft 20 comes to press upon the right end face of the work W. Then, the air cylinder 22 is operated such that the adjuster rod 23 is withdrawn to detach from the right end face of the work W. Accordingly, the work W is again clamped by and between the clamp shafts 10 and 20, as shown in FIG. 9 (step 9 of FIG. 3).

With the work W thus aligned, the stepping motor 30 is operated such that the torque is transmitted to the work W via the gears 31 and 32, and the work W is thereby rotated about its optimal center axis and then it is possible to grind the work W in a manner that the resulting right circular cylindrical body of the work W would have the largest possible diameter (step 10 of FIG. 3).

As described above, the external cylindrical grinding unit 1 of the invention is capable of automatically determining the optimal center axis of the work W and aligning the work W in the optimal grinding position, so that once the work W is set in the external cylindrical grinding unit 1 it is possible to continuously conduct the operations from the centering to the grinding of the work W without removing the work W from the external cylindrical grinding unit 1. Consequently, there is no need of installing a separate unit for centering a work, or a separate unit for setting the work into the grinding unit. Therefore, the installation space can be reduced. Also, it is possible to avoid errors in alignment that occur during the conveyance of the work W from one unit to another, so that high precision grinding is attained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:
1. An external cylindrical grinding unit comprising not only the conventional grinding system, but also:
 (i) an improved supporting system for supporting a cylindrical body to be ground consisting of
   (a) a pair of coaxial tubular clamp means clamping the cylindrical body between the ends thereof, and to rotate about their common axis, and,
   (b) a pair of rod means reciprocably mounted through the hollow of the respective tubular clamp means said rod means which are translatable in a direction normal to their axes;
 (ii) a measurement system consisting of
   (a) a plurality of sensors measuring the dimensions of cross sections of the cylindrical body at different locations along the common axis of the coaxial tubular clamp means;
 (iii) an arithmetic system for calculating an optimal center axis of the cylindrical body based on the dimensions of cross sections measured by the sensors;
 (iv) an alignment system for aligning the optimal center axis of the cylindrical body with the common rotation axis of the tubular clamp means, the alignment system consisting of
   (a) a first drive means controllably rotatable at least one of the tubular clamp means,
   (b) two second drive means controllably translatable the respective rod means in a direction normal to the axis of the respective rod means; and
 (v) a driving system consisting of
   (a) a third drive means to move at least one of the tubular clamp means in the axial direction,
   (b) two fourth drive means to controllably move respective rod means in the axial direction.

2. An external cylindrical grinding unit as claimed in claim 1, wherein the pair of rod means of the supporting system are translatable in the horizontal direction normal to their axes.

3. An external cylindrical grinding unit as claimed in claim 1 wherein the arithmetic system has a CPU and a CRT.

4. An external cylindrical grinding unit as claimed in claim 1 wherein the arithmetic system stores data representing a polar coordinate system whose origin coincides with the common axis of the tubular clamp means about which the cylindrical body is rotated for grinding, and the location of the optimal center axis of the cylindrical body calculated is stored in terms of the polar coordinates.

5. A method of grinding a generally cylindrical body having first and second ends to a right circular cylinder, comprising the steps of:
 clamping the body in a clamping means comprising a pair of tubular clamping means;
 measuring the cross-sectional dimension of the body;
 determining the optimal center axis of the body from the measurement of the cross-sectional dimension;
 determining an optimal grinding position of the optimal center axis of the body so that when the body is rotated and ground the resulting right circular cylinder will have the largest possible diameter;
 determining the difference between the actual position of the optimal center axis of the body and the optimal grinding position;
 clamping the first end of the body with a rod means which is positioned within one of the tubular clamping means while maintaining the clamping pressure of the other tubular clamping means on the second end of the body;

adjusting the first end of the body clamped by the rod means so that the end point of the optimal center axis is moved to a point corresponding to the determined optical grinding position by moving the clamping means in the required direction within the plane of the first end of the body;

reclamping the first end of the body held by the rod means with the corresponding tubular clamping means;

clamping the second end of the body with a second rod means which is positioned within the outer tubular clamping means while maintaining the clamping pressure of the first tubular clamping means on the first end of the body;

adjusting the second end of the body clamped by the rod means so that the other end point of the optimal center axis is moved to a point corresponding to the determined optimal grinding position by moving the clamping means in the required direction within the plane of the second end of the body;

reclamping the second end of the body held by the rod means with the other corresponding tubular clamping means; and and grinding the body to a right circular cylinder about the optimal center axis.

* * * * *